United States Patent [19]

Suzuki et al.

[11] Patent Number: 4,927,585
[45] Date of Patent: May 22, 1990

[54] PROCESS FOR PRODUCING HIGHLY ORIENTED RESIN-MADE REINFORCING MEMBER

[75] Inventors: Fumio Suzuki; Nobuhiro Akasaka; Makoto Honjo, all of Kanagawa, Japan

[73] Assignee: Sumitomo Electric Industries, Ltd., Osaka, Japan

[21] Appl. No.: 101,696

[22] Filed: Sep. 28, 1987

Related U.S. Application Data

[62] Division of Ser. No. 826,698, Feb. 6, 1986, Pat. No. 4,721,637.

[30] Foreign Application Priority Data

Feb. 6, 1985 [JP] Japan ................. 60-15781
Feb. 6, 1985 [JP] Japan ................. 60-15782

[51] Int. Cl.$^5$ .................. B29C 47/02; B29C 47/94
[52] U.S. Cl. ................... 264/171; 264/130; 264/173; 264/174; 264/176.1; 264/209.1
[58] Field of Search ............ 264/174, 171, 130, 173, 264/209.1, 176.1; 425/133.1, 97, 102, 466, 467, 144

[56] References Cited

U.S. PATENT DOCUMENTS

| | | | |
|---|---|---|---|
| 2,597,553 | 5/1952 | Weber | 425/144 |
| 2,742,669 | 4/1956 | Rhodes | 425/97 |
| 3,650,884 | 3/1972 | Hansen | 428/895 |
| 4,053,270 | 10/1977 | Collier et al. | 425/144 |
| 4,187,269 | 2/1980 | Huchinson et al. | 264/171 |
| 4,397,797 | 8/1983 | Nojiri et al. | 428/310.5 |
| 4,442,147 | 4/1984 | Schirmer | 428/910 |
| 4,451,306 | 5/1984 | Verne | 428/910 |
| 4,451,524 | 5/1984 | Matsumoto | 428/910 |
| 4,455,133 | 6/1984 | Jakob et al. | 425/466 |
| 4,578,307 | 3/1986 | Niki et al. | 428/395 |

FOREIGN PATENT DOCUMENTS

| | | |
|---|---|---|
| 0133909 | 3/1985 | European Pat. Off. |
| 2526616 | 1/1976 | Fed. Rep. of Germany |
| 58-202405 | 11/1983 | Japan |
| 59-105601 | 6/1984 | Japan |

Primary Examiner—Hubert C. Lorin
Attorney, Agent, or Firm—Sughrue, Mion, Zinn, Macpeak & Seas

[57] ABSTRACT

A process for producing a reinforcing member in a form of a solid wire or rod that contains a highly oriented resin as principal component and in which a degree of orientation decreases from center to periphery of said solid wire or rod, said process using a die having a molding port comprising at least one concentric molten resin extruding nozzle having a side wall with an inner and outer surface and a projecting rod member disposed along a central axis of said nozzle, and said process comprising extruding a molten highly oriented resin through said nozzle as a lubricant is applied to the inner surface of the side wall of said nozzle. A process for producing a reinforcing member in a form of a hollow pipe having a solid wall with an inner and outer surface that contains a highly oriented resin as principal component and in which a degree of orientation of said resin decreases from the inner surface of the solid wall of the pipe to the outer surface. A process for producing a reinforcing member in a form of a hollow pipe having a solid wall with an inner and outer surface that contains a highly oriented resin as a principal component and which has a highest degree of orientation in a center between the inner and outer surface of the solid wall of the pipe.

6 Claims, 7 Drawing Sheets

PROCESS FOR PRODUCING HIGHLY ORIENTED RESIN-MADE REINFORCING MEMBER

This is a division of application Ser. No. 826,698, filed 2/6/86, now U.S. Pat. No. 4,721,637.

BACKGROUND OF THE INVENTION

The present invention relates to a highly oriented resin-made reinforcing member and a process for producing the same. More particularly, the present invention relates to a highly oriented resin-made reinforcing material that has high tensile strength properties and a suitable degree of flexibility and which is useful typically as a reinforcing member in an optical fiber cable.

A variety of reinforcing members are employed in order to mechanically protect vulnerable articles by means of supporting and reinforcing them. A typical application of such reinforcing members is in the glass fiber cables used for light transmission purposes.

Glass fibers used for light transmission purposes are brittle and are not easily bendable, so individual optical fibers emerging from the drawing die are usually provided with protective and other outer coatings. The optical fibers having such primary and secondary coatings are then assembled into a cable, with plastic (e.g. polyethylene) coated steel wires and metal pipes being incorporated as tension members so as to render the coated fibers resistant to the forces that will develop during and after installation operations.

Figure 10:
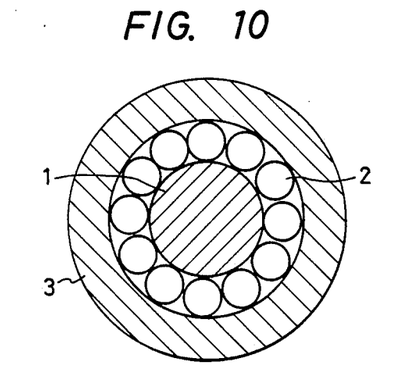
FIG. 10 is a diagrammatic cross section of a conventional layer stranded optical fiber cable.

An example of such conventional optical fiber cable is shown in cross section in FIG. 10. Being generally referred to as the layer stranded type, the cable shown in FIG. 10 consists of a plurality of coated fibers 2 that are stranded in a layer form around a central tension member 1 and are provided with a tubular coating 3. The central tension member 1 is usually made of a steel wire coated with a plastic material such as polyethylene, and the tubular coating 3 is typically formed of a plastic material such as polyethylene.

The metallic tension member has the advantage of imparting satisfactory tensile strength to the cable but, on the other hand, the cable becomes susceptible to electrical shock and electromagnetic induction. In addition, the cable with the metallic tension member is heavy and is not easy to handle during installation operations. Furthermore, some provisions must be made for protecting the cable from corrosion and other attacks that may occur during storage and service periods. These disadvantages are sometimes serious enough to reduce the inherent advantages of the optical fiber such as lightweightness, immunity to electromagnetic induction and cross talk, low transmission loss and high transmission capacity. It is therefore strongly desired to develop nonmetallic tension members that are lightweight and exhibit greater durability under corrosive and other hostile conditions.

The tubular coating on the optical fiber cable is customarily made of easily extrusion-coatable resins such as polyamide and polypropylene, but most of them have low Young's moduli ( <ca. 100 kg/mm$^2$) and high thermal expansion coefficients (ca. 10$^{-4}$), which differ considerably from the respective values of the glass used as the principal component of the optical fiber (7,000 kg/mm$^2$ and ca. 10$^{-7}$). Therefore, a non-metallic optical fiber cable in which both the central tension member and the tubular coating are made of a conventional, easily extrusion-coatable resin material will experience a significant increase in transmission loss as a result of temperature changes or if it is subjected to tensile force.

Under low temperature conditions, the central tension member and the tubular coating will contract to a greater extent than the fiber itself and the resulting stress will produce bends and lateral compression in the fiber. These effects are major factors in the occurrence of transmission loss (microbending loss) and/or dispersion. If, on the other hand, the central tension member and the tubular coating are stretched under high temperatures or upon application of great tensile force, the fibers are also affected and show stress distortion, which is another cause of transmission loss and dispersion. Therefore, the optical fiber cable in which the central tension member and tubular coating are solely made of the conventional extrusion-coatable resin will inevitably experience a noticeable increase in transmission loss as a result of temperature changes or upon application of high tensile force.

With a view to improving the physical properties of the resin-made members used in optical fiber cables, attempts are being made to introduce high molecular orientation in the resinous members. One method that has been proposed as a result of these efforts involves drawing polymers such as ultrahigh molecular weight, polyethylene, polyethylene terephthalate and polyoxymethylene so as to introduce molecular orientation in the polymers in the longitudinal direction, or in the direction parallel to the axis of the cable. By causing such molecular orientation in the resinous member in the cable's axial direction, a Young's modulus that is at least twice the value for the undrawn resin and a linear expansion coefficient (ie, coefficient of thermal expansion in the direction of orientation) that is no more than half the value for the undrawn resin can be attained. The drawn resinous member therefore exhibits a commercially satisfactory tensile strength, a thermal expansion coefficient that is not different from that of the fiber by a factor greater than 100, and even a reasonable degree of resistance to lateral compression. These features combine to provide the possibility of solving the problem of microbending associated with lateral compression.

However, an oriented resin exhibiting satisfactory strength in the direction of orientation has a very low strength in the direction orthogonal thereto. This insufficiency of strength in the transversal direction may be so great that the resin can be easily torn apart by hand along the axis of orientation. A member made of such oriented resin will be affected and torn apart fairly easily if it is subjected to external forces. It may be ruptured under high lateral compression, and may readily buckle if it is bent.

Several methods have been proposed for solving these problems and, as shown in Unexamined Published Japanese Patent Application No. 105601/1984 with respect to the loose tube-type, coated optical fiber, the tubular coating made of a longitudinally oriented resin is coated with a layer of a conventional, easily extrusion-coatable resin material in a substantial thickness so as to provide the tubular coating with improved resistance to tear and lateral compression. But then, the substantial thickness of the outer coat will impair the flexibility of the fiber and increase the overall diameter and weight of the cable. Because of these obstacles, the use of a tubular coating solely made of an oriented resin involves considerable difficulty and has met with no commercial success.

According to another recently proposed method for introducing molecular orientation, a high molecular weight, liquid-crystal material such as a benzoic acid copolymer that shows crystallinity in a molten state is shaped at high shear rate or drawdown ratio (see Unexamined Published Japanese Patent Application No. 202405/1983). But this method has very limited flexibility in shaping conditions and the physical properties of the shaped polymer are not completely satisfactory for commercial use since it has problems similar to those described in connection with the longitudinally oriented resin.

As shown in detail hereinabove, none of the known highly oriented resin made reinforcing members have sufficient tensile strength to be useful as tension members for incorporation in optical fiber cables.

SUMMARY OF THE INVENTION

One object, therefore, of the present invention is to provide a highly oriented resin-made reinforcing member that has both satisfactory tensile strength properties in the longitudinal direction and a linear expansion coefficient comparable to that of an optical fiber and which additionally exhibits a reasonable degree of flexibility.

Another object of the present invention is to provide a process for producing such highly oriented resinmade reinforcing member that is useful in the fabrication of a completely non-metallic optical fiber cable solely made of glass and a plastic material.

The present inventors made concerted efforts to solve the aforementioned problems of the conventional nonmetallic materials having high tensile strength and to develop a new highly oriented resin made reinforcing member. As a result, the inventors found that using a highly oriented resin as the principal component and introducing a specified distribution of the degree of orientation in this resin are highly effective for the purpose of producing a reinforcing member that exhibits good tensile strength properties and a reasonable degree of flexibility and which is useful as a protective member for optical fibers and other vulnerable products. The present invention has a been accomplished on the basis of this finding.

The highly oriented resin-made reinforcing member of the present invention is characterized by containing a highly oriented resin as the principal component and having a cross-sectional distribution of the degree of orientation.

BRIEF DESCRIPTION OF THE DRAWINGS

FIG. 2(a) shows diagrammatically the die used in the production of the reinforcing member shown in FIG. 1(a), and FIG. 2(b) also shows diagrammatically the distribution of shear stress across the diameter of the product obtained by using said die;

DETAILED DESCRIPTION OF THE INVENTION

The highly oriented resin used as the principal component of the reinforcing member of the present invention is selected from among the high-molecular weight materials that can be drawn to exhibit a high degree of orientation, such as ultrahigh-molecular weight polyethylene, polyethylene terephthalate, polyocymethylene, and liquid-crystal high-molecular weight compounds.

Illustrative liquid-crystal high-molecular weight compounds include wholly aromatic polyesters, aromaticaliphatic polyesters, wholly aromatic poly (ester-amide), aromatic-aliphatic poly(ester-amide, aromatic polyazomethines aromatic polyester carbonates, and mixtures thereof. Preferred examples are wholly aromatic polyesters such as a copolymer of naphthoic acid, biphenol and terephthalic acid, and a copolymer of paraoxybenzoic acid, biphenol and terephthalic acid; aromatic-aliphatic polyesters such as a copolymer of paraoxybenzoic acid and polyethylene terephthalate; and aromatic polyesterpolyamides poly(ester-amide) such as a copolymer of naphthoic acid, aminophenol and terephthalic acid.

The highly oriented resin made reinforcing member of the present invention may assume any desired shape, i.e., a wire, rod, sheet or a pipe (including a rectangular pipe), that may be appropriately selected and used depending on the shape and other properties of the article to be reinforced. These shapes are roughly divided into two types, solid and hollow, and each type may be formed in a single layer of the highly oriented resin or in two or more layers at lease one of which is made of a resin having a low degree of orientation. This type of resin used in the multi-layered structure is a material with a low molecular weight that has little or no crystallinity and which exhibits a high degree of flexibility or rubber elasticity. Preferred examples of such material are polyurethane, low-molecular weight polyethylene, polyvinyl chloride, polystyrene, polyamide, polypropylene, and thermoplastic elastomers, as well as heat-, light-, water- or electron beam-crosslinkable materials such as epoxy polymers, acrylic resins and silicone resins. An appropriate resin may be selected depending upon the use of the article to be protected and other factors such as the desired efficiency of its production.

Figure 1A:
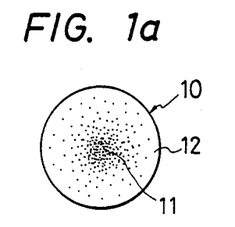
FIGS. 1(a) to (c) are cross sections showing diagrammatically three different preferred embodiments of the highly oriented resin made reinforcing member of the present invention.
Figure 1B:
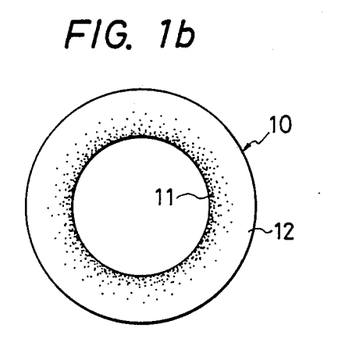
Figure 1C:
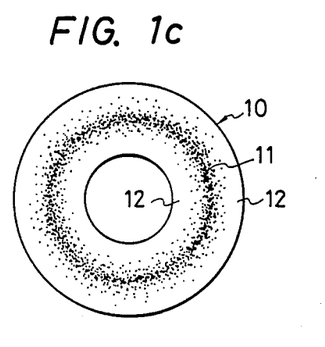

Examples of the structure of the highly oriented resin-made reinforcing member in accordance with the present invention are shown in FIG. 1(a) to (c). FIG. 1(a) is a diagrammatic cross section of a solid reinforcing member 10 in the form of either a wire or rod that is composed of a central highly oriented area 11 and a peripheral less oriented area 12, providing a distribution curve wherein the degree of orientation decreases from the center outward. The reinforcing member shown in FIG. 1(a) may be realized from a single highly oriented resin or a mixture of two or more of such resins; alternatively, it may have a multi-layered structure containing a highly oriented resin layer and a layer of less oriented resin material.

Figure 2A:
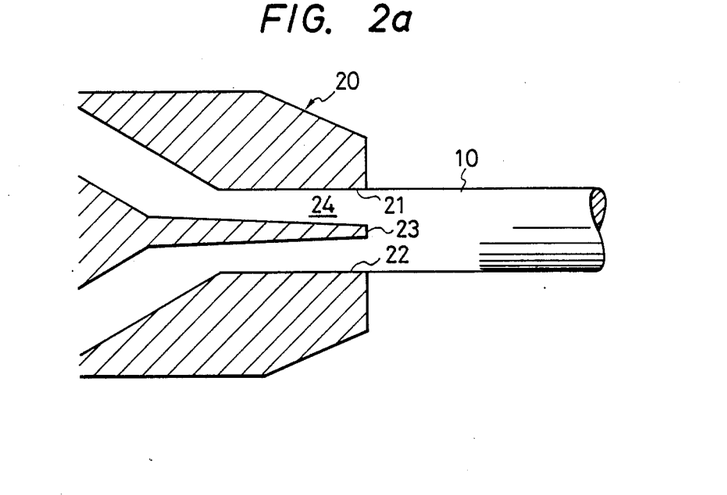

A typical method for making reinforcing member shown in FIG. 1(a) is described below. FIG. 2(a) is a diagrammatic cross section of the delivery end of a die 20 that can be used in producing a reinforcing material from a single highly oriented resin or a mixture of two or more of such resins. The die 20 has a circular molding port 21 through which a central tension member 10 is extruded and an annular channel 24 formed between the side wall 22 extending from the port 21 and a central projecting rod 23. In the actual operation of extruding the reinforcing member 10, a lubricant is applied only to the side wall 22 of the annular channel 24 so that little frictional force will act in the space between the peripheral surface of the member 10 and the side wall 22 while shear stress will be exerted only on the central portion of the member 10 being extruded. If such precautions are taken, the reinforcing member emerging from the die will have a highly oriented region in the center and its vicinity, as shown in FIG. 1(a). The mechanism behind this effect is more specifically explained with reference to FIG. 2(b). The great shear stress acting on the space between the center of the tension member 10 and the projecting rod 23 in the center of the die 20 will exert a substantial drawing force, whereas because of the presence of the lubricant on the side wall 22, the shear stress acting on the space between the peripheral surface of the tension member 10 and the die 20 is too small to produce a drawing force. A diametral distribution of the shear stress acting on the tension member 10 being extruded through the die 20 is indicated by curve 25 in FIG. 2(b). In this central tension member, the degree of orientation increase gradually from its periphery to the center.

Figure 2B:
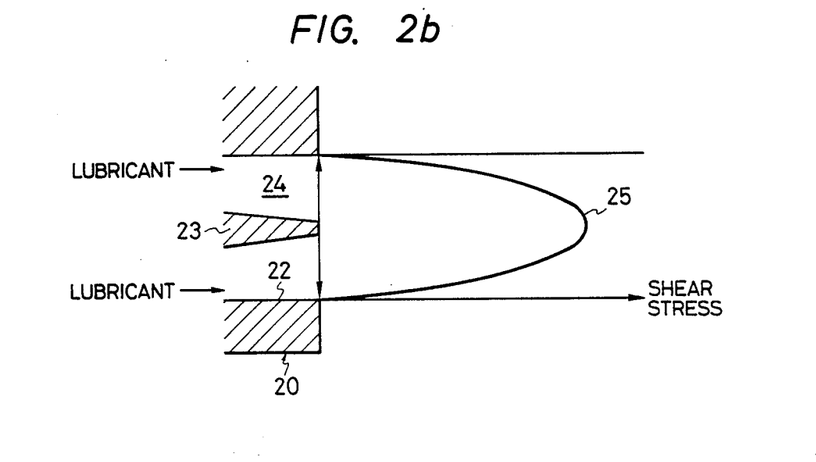

The molding port (nozzle) shown in FIG. 2(a) may be surrounded by at least one more coaxial nozzle, porviding a duplex or multiplex nozzle. Extrusion through this type of nozzle will produce a central tension member of a dual or multiple-layered structure that consists of a central highly oriented resin layer having a distribution of the degree of orientation as shown in FIG. 2(b) and a peripheral less oriented resin layer. In producing this type of central tension member, it is advantageous to apply another film of lubricant to the wall of the nozzle through which a layer of the less oriented resin is extruded. Needless to say, the concept described above may be employed to produce a central tension member composed of three or more resin layers. If desired, shaping may be accomplished with a tension being applied to the highly oriented resin passing through the inner nozzle, so that the central highly oriented resin will have a uniform distribution in terms of the degree of orientation and will be coated with a thin layer of the less oriented resin. It should be noted that this embodiment of the tension member is also within the scope of the present invention.

In the case of the reinfocing member having a composite structure made of the highly oriented resin layer and the less oriented resin layer, the relative thickness of the latter layer as compared with the former is preferably within the range of 5-50%. If the thickness of the less oriented resin layer is greater than 50% of the thickness of the highly oriented layer, not only does the reinforcing member become excessively heavy but also the overall diameter of the cable is increased with a resultant decrease in its flexibility. If the thickness of the less oriented resin layer is smaller than 5% of the thickness of the highly oriented resin layer, it is very difficult to effectively prevent the highly oriented region from bending or tearing in the direction of orientation.

Also provided in accordance with the present invention is a reinforcing member 10 of the hollow pipe shape shown in FIG. 1(b), wherein the degree of orientation in the solid portion decreases from its inner surface to the outer periphery. This reinforcing member, as in the case of the member shown in FIG. 1(a), is composed of a highly oriented area 11 close to the inner surface of the pipe and a less oriented area 12 close to its outer periphery and may be formed from a single highly oriented resin or a mixture of two or more of such resins. Alternatively, the member may have a dual or multi-layered structure wherein the inner surface of the pipe is composed of a highly oriented resin or a mixture thereof having a uniform high degree of orientation or such a profile that the degree of orientation decreases outwardly and wherein the outer surface of the pipe is formed of at least one layer of less oriented resin.

Figure 3A:
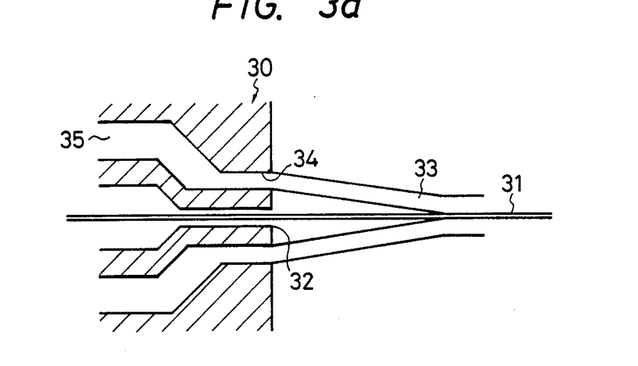
FIG. 3(a) shows diagrammatically the die used in producing the reinforcing member shown in FIG. 1(b)
Figure 3B:
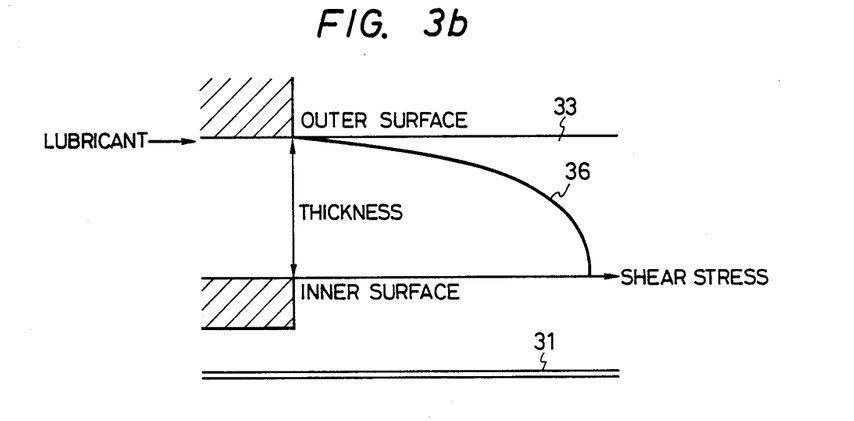
FIG. 3(b) shows diagrammatically the distribution of shear stress in the direction of the radius of the product obtained by using said die.

The reinforcing member 10 shown in FIG. 1(b) may be fabricated with a die having the cross section shown diagrammatically in FIG. 3(a) and providing the shear stress profile illustrated in FIG. 3(b). In this embodiment, the reinforcing member 10 is extruded simultaneously with the article 31 which is to be protected. As shown in FIG. 3(a), the die 30 has a center channel 32 through which the article 31 is delivered, a molding port (nozzle) 34 that is concentric with the center channel 32 and through which a tubular reinforcing material 33 is extruded, and an annular channel 35 communicating with said nozzle. In actual operation, a lubricant is applied only to the inner surface of the outer periphery of the annular channel 35 so that little frictional force will act on the space between the outer surface of the tubular reinforcing material 33 and the die. With these precautions being taken, the tubular reinforcing material 33 is drawn from the die as the feed is supplied through the annular channel 35. As a result, a great shear stress will act on the space between the inner surface of the reinforcing member 33 and the die, exerting a great drawing force on the inner surface of the reinforcing member, whereas little drawing force will act on the space between the outer surface of the tubular reinforcing material and the die because of the lubricant present on the inner surface of the outer periphery of the annular channel 35. This provides a degree-of-orientation profile across the thickness of the solid portion of the tubular reinforcing member is indicated by curve 36 in FIG. 3(b). In other words, in the tubular reinforcing member fabricated by using the die shown in FIG. 3(a), the degree of orientation decreases grdually from the inner surface of the tube to its outer periphery.

In the embodiment shown in FIG. 3(a) and (b), the reinforcing member is formed simultaneously with the article to be protected so as to increase the efficiency of fabrication procedures. Needless to say, the reinforcing member may be formed separately from the article to be protected by, for example blowing a fluid stream such as air or an inert gas (e.g. $N_2$) into the center channel 32.

If the reinforcing member is formed from a mixture of a highly oriented resin and a less oriented resin, it is preferred that the thickness of the layer of the less oriented resin satisfies a certain requirement; that is, in order to fabricate an advantageous reinforcing member, the thickness of the less oriented resin layer is preferably within the range of 5–50% of the wall thickness of the highly oriented resin pipe including the highly oriented area. If the thickness of the less oriented resin layer is less than 5% of the thickness of the pipe wall, it is very difficult to effectively prevent the highly oriented region from experiencing such troubles as tearing due to forces working transversally to the direction of orientation and buckling due to repeated bending. If, on the other hand, the thickness of the less oriented resin layer exceeds 50% of the thickness of the pipe wall not only does the reinforcing member become excessively heavy but also the thickness of the solid portion of the pipe is increased, with a resultant decrease in its flexibility.

Another preferred embodiment of the reinforcing member is shown in FIG. 1(c) and indicated by 10; this member is also in the form of a pipe and its solid portion has a highly oriented area 11 in the central portion and a less oriented area 12 on both sides, i.e., in the area close to the inner surface of the solid portion and in the area close to its outer periphery. As in the embodiments shown in FIG. 1(a) and (b), the reinforcing member depicted in FIG. 1(c) may be made of a single highly oriented resin or a mixture of two or more of such resins. Alternatively, the reinforcing member 10 may be realized as a multi-layered structure consisting of three or more layers, wherein a layer of the highly oriented resin is sandwiched between layers made of the same or different less oriented resins.

Figure 4A:
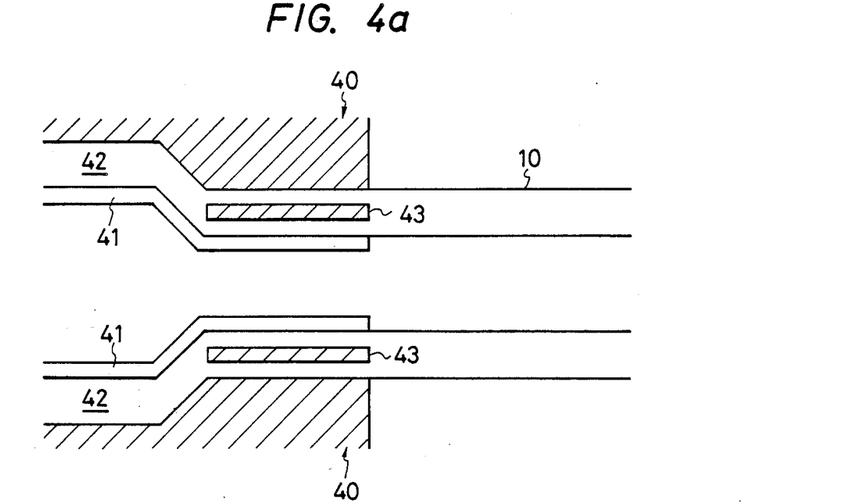
FIG. 4(a) shows diagrammatically the die used in producing the hollow reinforcing member shown in FIG. 1(c)
Figure 4B:
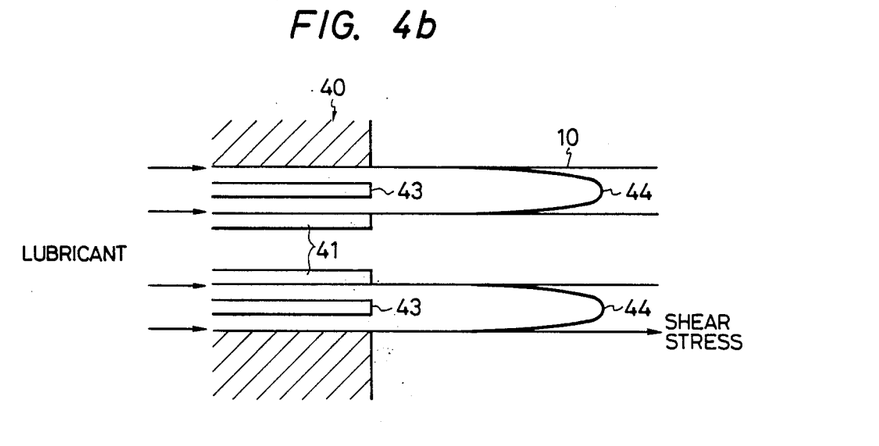
FIG. 4(b) shows diagrammatically the distribution of shear stress across the solid portion of the product obtained by using said die.

The reinforcing member depicted in FIG. 1(c) may be fabricated by using a die having the cross section shown diagrammatically in FIG. 4(a) and providing e degree-of-orientation profile shown diagrammatically in FIG. 4(b). The die 40 shown in FIG. 4(a) has a central projecting rod that determines the inside diameter of the tubular reinforcing member 10 or an annular member 41 that has a central opening through which air or an inert gas is supplied, an annular channel 42 that surrounds said annular member 41 concentrically and through which the reinforcing member is extruded, and a stress providing member 43 that is disposed concentrically within the annular channel 42 at the delivery end of the die. In the actual operation of extruding the reinforcing member 10, a lubricant is applied to both the inner and outer surface of the annular channel 42 so that little frictional force will act in the space between the inner or outer surface of the reinforcing member 10 and the die, whereas a great shear stress will be exerted by the member 43 to produce a great drawing force. The solid portion of the tubular reinforcing member 10 being extruded from the die will have a shear stress profile as indicated by curve 44 in FIG. 4(b). The resulting product 10 has the desired degree-of-orientation profile wherein the degree of orientation is maximum at the center of the solid portion of the member and decreases gradually toward both its outer and inner surfaces.

The reinforcing member 10 shown in FIG. 1(c) may be formed as a three-layered structure by extruding tubes of less oriented resins, which may be the same or different, through concentric annular nozzles provided within and outside the annular channel 42 in the die shown in FIG. 4(a). Alternatively, a concentric annular nozzle may be provided within the annular channel 35 in the die shown in FIG. 3(a), and a tube of a less oriented resin is extruded through that nozzle simultaneously with the tubular reinforcing member of FIG. 1(b) so as to obtain an integral combination of the two tubes.

Again, as described in connection with FIG. 1(a) and (b), the wall thickness of the tube of the less oriented resin is preferably within the range of 5–50% of the wall thickness of the tube of the highly oriented resin. The critically of this range is also the same as what has already been described.

A reinforcing member having the structure shown in FIG. 1(c) may also be fabricated by the following procedures: a concentric annular nozzle is disposed within the annular channel 35 in the die of FIG. 3(a), and tubes of a highly oriented resin are extruded simultaneously through the two nozzles, with a lubricant being applied both to the inner surface of the outer periphery of the annular channel 35 and to the inner surface of the inner periphery of the additional annular nozzle (ie, the area close to the nozzle hole) so that no shear stress will be exerted on that portion of the reinforcing material which is passing through the space defined by these two surfaces. The embodiment described in this paragraph is equivalent to a structure wherein a tube having the degree-oforientation profile shown in FIG. 1(b) is combined integrally with a tube having the degree-of-orientation distribution which is reverse in profile.

The profile of the degree of orientation desired for each of the embodiments shown above may be attained by using a gaseous or liquid lubricant during extrusion of the specific reinforcing member. The lubricant supplied will accelerate, or sometimes impede, the flowability of the highly oriented resin at a specified interface. Illustrative lubricants that may be used for this purpose include inert gases such as helium and nitrogen, as well as silicone oil, fluorinated inert liquids, lithium soap and aluminum complex soap.

The desired profile of the degree of orientation may also be introduced into the reinforcing member by providing uneven conditions for its extrusion such as, for example, creating a temperature gradient that is complementary to the intended profile of the degree of orientation. This method is also included within the scope of the present invention.

In the reinforcing member prepared in accordance with the present invention, the boundary between the highly oriented area and the less oriented area in the highly oriented resin portion cannot be clearly defined in terms of the degree of orientation, but this continuous profile is common, rather than exceptional, for the embodiment shown in FIG. 1(a), and it is most preferred that the degree of orientation will decrease gradually from its center to the periphery.

Vulnerable articles which perform poorly with respect to deflective strength, and resistance to tensile and compressive stresses must be mechanically supported and protected by reinforcing members which will prevent failure of these articles when subjected to external forces or during use, transportation or handling periods. It is therefore desired that the reinforcing members employed should provide the articles to be protected with the required values of the properties listed above while experiencing no change in their thermal expansion coefficients under variations in the ambient temperature that would otherwise cause adverse effects on the articles.

In each of the highly oriented resin-made reinforcing members of the present invention having the configurations shown above, the central, highly oriented resin portion imparts satisfactory longitudinal tensile strength to optical fibers and other vulnerable articles. Since the linear expansion coefficient of the reinforcing member of the present invention is governed by this highly oriented resin portion, the reinforcing member has a linear expansion coefficient that is no more than half the value for a less oriented resin layer or a highly oriented resin layer having a lower degree of orientation, and this means that the reinforcing member of the present invention has a thermal expansion coefficient close to that of a light transmitting glass fiber or other articles to be protected.

The surface of the highly oriented reinforcing member is provided with a less oriented resin layer or a highly oriented resin layer having a lower degree of orientation, and the highly oriented area is protected by this less oriented area. Therefore, the reinforcing member will not be torn apart in the longitudinal direction under any external force; in addition, the rigidity of the highly oriented area will impart the ability to withstand great lateral compression without being ruptured. The highly oriented reinforcing member of the present invention also attains remarkable and unexpected improvements in flexibility and wear resistance compared with the conventional highly oriented resins.

For the reasons stated above, the highly oriented resin-made reinforcing material fabricated in accordance with the present invention will perform satisfactorily as a commercial tension member.

For the sake of convenience and clarity, the foregoing description of the present invention is limited to the case where the highly oriented resin-made reinforcing material is used in an optical fiber cable, especially as the central tension member. It should however be understood that the concept of the present invention finds utility in other applications. As will be obvious from the following examples, the reinforcing member of the present invention, if it is used as a noncentral tension member, an outer coating or an inner coating, will find extensive use in fields where protection and reinforcing of vulnerable articles are desired. It should also be noted that the reinforcing member of the present invention may be employed in the fabrication of articles other than optical fiber cables such as wires and ropes.

The following examples are provided for the purpose of further illustrating the highly oriented resin-made reinforcing member of the present invention and the process for producing the same. Applications of the reinforcing member so produced are also described hereinafter. It should however be noted that these examples and applications are by no means intended to limit the scope of the present invention.

EXAMPLE 1

A wholly aromatic polyester that exhibited liquid crystallinity in a molten state was derived from a copolymer of 60% p-hydroxy-benzoic acid, 20% terephthalic acid and 20% 6-hydroxy-2-naphthoic acid. This polyester was melt-extruded from an extruder having a crosshead die of the configuration shown in FIG. 2(a). The extrudate ran just beneath the crosshead and the molten resin at the interface with the die 20 was not highly oriented because the silicone oil film that was constantly supplied to that interface buffered the shear force exerted by the die 20. On the other hand, the projecting rod 23 exerted a great shear stress and caused a high degree orientation in the central portion of the resin. Because of this diametral shear stress profile, the reinforcing member emerging from the the extruder had the desired degree-of-orientation profile in that it decreased gradually from the center of the member to its periphery.

EXAMPLE 2

The reinforcing member fabricated in Example 1 was coated with a thin low-density polyethylene layer by feeding it through a conventional electric wire coating extruder having a crosshead die immediately below the crosshead shown in Example 1.

APPLICATION 1

Figure 5:
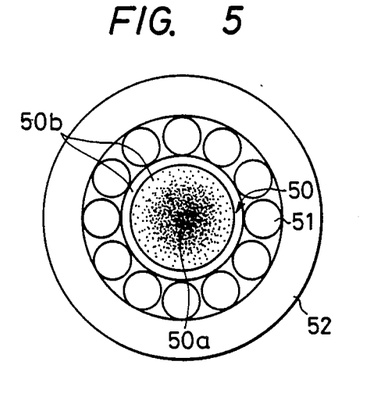
FIG. 5 is a cross section of an optical fiber cable using the reinforcing member of the present invention as a central tension member.

The solid reinforcing member prepared in Example 2 that consists of a central highly oriented area and a peripheral less oriented area is incorporated in a layer stranded optical fiber cable. The configuration of the reinforced optical cable is hereunder described with reference to FIGS. 5 and 10. FIG. 5 is a cross section of the cable wherein the reinforcing member produced in Example 2 is used as the central tension member FIG. 10 is a cross section of an optical cable using a conventional central tension member (ie, coated steel wire).

In the optical cable shown in FIG. 5, a plurality of coated fibers 51 are stranded around a tension member 50 that is made of the reinforcing member prepared in Example 2 and the resulting layer of the fibers is provided with a jacket made of a tubular coating 52. The central tension member 50 has a dual structure diametrally which consists of the central portion 50a made of the highly oriented resin (wholly aromatic polyester) and the peripheral portion 50b made of the less oriented resin (low-density polyethylene). The cross-sectional area of the central portion 50a is at least half the total crosssectional area of the central tension member 50. It is desirable for the thickness of the peripheral portion 50b to be substantially smaller than the radius of the central portion 50a.

The central tension member incorporated in the optical fiber cable shown in FIG. 5 exhibits satisfactory tensile strength properties in the longitudinal direction and a linear expansion coefficient that is comparable to the optical fibers while displaying a reasonable degree of flexibility and wear resistance. Therefore, the optical cable having the tubular coating 52 that is made of a conventional resin material is totally non-metallic in that it is solely made of glass and resin materials. This nonmetallic optical cable has satisfactory tensile strength and will experience a minimal increase in transmission loss resulting from temperature changes.

In the foregoing description, the reinforcing member of the present invention is applied to a layer stranded optical cable, but it should be understood that the concept of the present invention is also applicable to other types of optical cables, such as the multifiber unit type and the spacer type wherein individual coated fibers are loosely held on a spacer. No matter which type of optical cable is being manufactured, the tension member prepared in accordance with the present invention is employed as the central strength member.

The conventional layer stranded optical fiber cable shown in FIG. 10 has the same configuration as the cable shown in FIG. 5 except that the central tension member 50 is replaced by the central tension member 1 consisting of a steel wire coated with a plastic material such as polyethylene. This optical cable is not advantageous because it has various problems as already pointed out in connection with the description of the prior art.

APPLICATION 2: USE AS A TENSION MEMBER POSITIONED OFF THE CABLE AXIS

Figure 6:
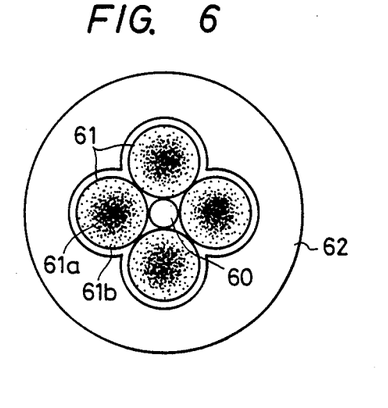
FIG. 6 is a cross section of an optical fiber cable using the reinforcing member of the present invention as a tension member in portions other than the center.

As shown in FIG. 6, a plurality of tension members 61 each made of the reinforcing member of the present invention may be positioned around one or more coated optical fibers 60 and are coated with a jacket 62. This design is particularly suitable for use when high tensile strength is required for an optical cable incorporating a small number of coated fibers, typically one coated fiber. In FIG. 6, the components that are equivalent to those shown in Application 1 with reference to FIG. 5 are identified by like numerals, and 61a and 61b represent the highly oriented area and the less oriented area, respectively. For the configuration of FIG. 6, the less oriented area 61b is particularly important since, because of its presence, wear due to abrasion between individual tension members 61 resulting from bending, vibration and other external forces is greatly reduced and extended use of the cable is ensured.

EXAMPLE 3

An aromatic-aliphatic polyester derived from a copolymer of 60% p-hydroxybenzoic acid and 40% polyethylene terephthalate was coated onto an article to be protected by feeding through an extruder equipped with a conventional electric wire coating crosshead die having the configuration shown in FIG. 3(a). A silicone oil was applied to the inner surface of the outer periphery of the annular channel 35 so that insufficient shear stress would be exerted to cause a high degree of orientation in that portion of the molten resin which was moving in contact with the inner surface of the die 30. On the other hand, no silicone oil or other lubricant was present on the outer surface of the inner passage through which the article to be protected was extruded, so a sufficient amount of shear stress to cause a high degree of orientation was exerted on that portion of the molten resin which was flowing in contact with said outer surface of the inner passage as shown in FIG. 3(b). As a result, a tubular reinforcing member was produced wherein the degree of orientation decreased gradually from the inner surface of the solid portion of the tube to its periphery.

EXAMPLE 4

The tubular reinforcing member prepared in Example 3 was coated with a less oriented resin (polyamide 12) layer in a thickness of 0.2 mm by feeding said member through an extruder positioned downstream of the machine used in Example 3.

APPLICATION 3: USE AS AN OUTER COAT (1)

Figure 7A:
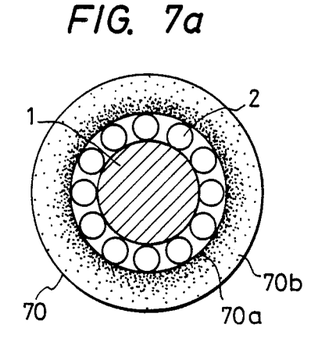
FIG. 7(a) and FIG. 9 are each a cross section of an optical fiber cable using the reinforcing member of the present invention as the outer coat.

The tubular reinforcing member prepared in Example 3 was used as an outer coat surrounding a plurality of coated fibers as shown in FIG. 7(a). The optical fiber cable shown in FIG. 7(a) was the same as the layer stranded cable illustrated in FIG. 5 except that the tubular coating 52 was replaced by the reinforcing member 70 having the degree-of-orientation profile shown in FIG. 1(b). Needless to say, the cable shown in FIG. 7(a) can be rendered totally non-metallic by using a central tension member that is made of a reinforcing member having the degree-of-orientation profile shown in FIG. 1(a) and which is prepared in Example 1 or 2. The outer coat shown in FIG. 7(a) is formed solely of a highly oriented resin or a mixture thereof and is characterized by having a highly oriented area 70a) at the inner surface of the solid portion of the tube and a less oriented area 70b at its periphery.

The most prominent results from using the reinforcing member of the present invention as the outer coat of an optical cable are improvements in the wear resistance, tear strength and flexibility of the highly oriented resin.

APPLICATION 4: USE AS AN INNER COAT (1)

Figure 7B:
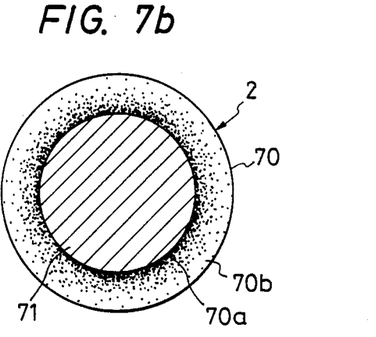
FIG. 7(b) and FIG. 8(c) are each a cross section of an optical fiber carrying a tight coat of the reinforcing member of the present invention.

An optical fiber carrying a coat made of the reinforcing member of the present invention is shown in FIG. 7(b). The coated fiber of this design is generally referred to as "a fiber with a tight coat" by manufacturers of optical fiber cables. The tight coat incorporates the same design concept as that utilized by the outer coat described in Application 3.

the most significant aspect of the fiber design shown above is that it achieves remarkable improvements in wear resistance and flexibility compared with the case of merely using a highly oriented resin, and that the fiber is capable of withstanding very rough handling as may be encountered in cabling operations.

The coated fiber generally indicated at 2 in FIG. 7(b) corresponds to the fibers shown in Applications 1 to 3; this fiber is seldom used as it is but is typically put to service after being provided with a jacket and other necessary coatings.

EXAMPLE 5

A wholly aromatic polyester was derived from a copolymer of 73% p-hydroxybenzoic acid and 27% 6-hydroxy2-napththoic acid. A tube was extruded from this polyester using a conventional electric wire coating crosshead die having the configuration shown in FIG. 4a. A shear stress providing member (I.D., 6.0 mm; O.D., 8.0 mm) was disposed at the land in the annular channel 42 between the die 40 (I.D., 10.0 mm) and the annular member 42 (O.D., 4.0 mm). A silicone oil was applied to both the inner surface of the die 40 and the outer surface of the annular member 41 so that shear stress which would be sufficient to cause a high degree of orientation in the molten resin would not result from friction with the die 40 or the annular member 41. On the other hand, the portion of the molten resin moving in contact with the shear stress providing member was subjected to a sufficient amount of shear stress to cause a high degree of orientation. As a result, a tubular reinforcing member wherein the degree of orientation was the highest in the center of the solid portion of the tube and decreased gradually to both its inner and outer peripheries was obtained.

EXAMPLE 6

Two glass fibers each coated with an ultraviolet curable resin to give a diameter of 0.25 mm were enclosed in a loose tube of polyamide 12 having an inside diameter of 1.0 mm and an outside diameter of 1.6 mm. The so coated glass fibers were extrusion-coated with a fully aromatic polyester by the method shown in Example 5 and were further coated with a less oriented resin (polyvinyl chloride) to bring the outside diameter to 2.6 mm.

APPLICATION 5: USE AS AN INNER COAT (2)

Figure 8A:
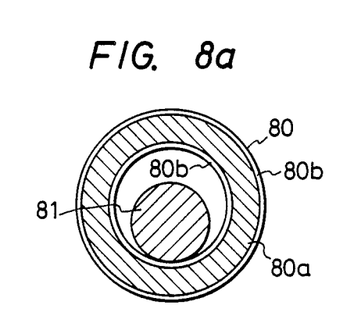
FIG. 8(a) and (b) are each a cross section of an optical fiber carrying a loose coat of the reinforcing member of the present invention.
Figure 8B:
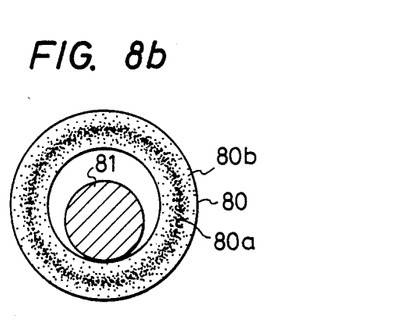

Optical fibers carrying a coat made of the reinforcing member of the present invention are shown in FIG. 8(a) and (b). In contrast with the coated fiber shown in FIG. 7(b), the designs illustrated in FIG. 8(a) and (b) are generally referred to as "fibers with a loose tube" by manufacturers of optical fiber cables. The loose tube incorporates the same design concept as that utilized by the outer coat described in Application 3.

The loose tube 80 shown in FIG. 8(a) consists of a highly oriented area 80a and a less oriented area 80b; an optical fiber 81 is loosely confined in the hollow portion of the tube. The loose tube shown in FIG. 8(b) is the same as what is illustrated in FIG. 8(a) except that it is solely made of a highly oriented resin.

The loose tubing design shown in FIG. 8(a) and (b) has substantially the same features as the tight coat shown in Application 4 by reference to FIG. 7(b); specially prominent features are that it provides significant improvements in bending and pressure-resistant properties and facilitating cabling operations.

APPLICATION 7: USE AS AN INNER COAT (4)

Figure 8C:
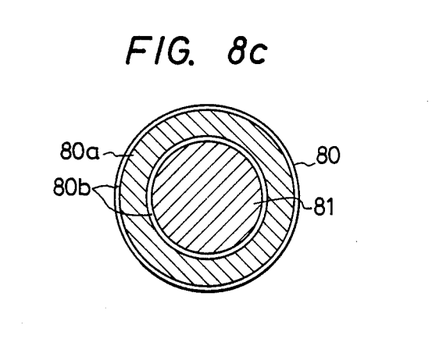

An optical fiber 81 carrying a coat of the reinforcing member 80 that was prepared in Example 5 and which had the degree-of-orientation profile shown in FIG. 1(c) is illustrated in FIG. 8(c). This fiber design is also in the category of the "fiber with a tight coat" shown in Application 4 and, therefore, is expected to bring about the same advantages.

APPLICATION 8: USE AS AN OUTER COAT (2)

Figure 9:
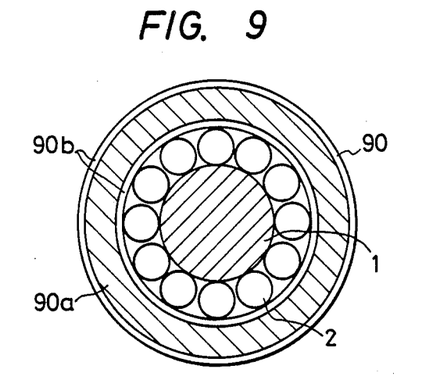

A layer stranded optical cable carrying an outer coat of the reinforcing member prepared in Example 6 is shown diagrammatically in FIG. 9. The outer coat 90 shown has a three-layered structure consisting of a central, highly oriented resin layer 90a sandwiched between less oriented resin layers 90b and 90c. This outer coat will exhibit protective effects comparable to that shown in FIG. 7(a).

As will be apparent from the foregoing description, the highly oriented resin-made reinforcing material prepared in accordance with the present invention which may be used with an optical fiber cable has a highly oriented resin as its substantial core portion and at least the periphery of this core is formed of a less oriented resin. Because of this "composite" structure, the reinforcing member of the present invention is expected to achieve the following advantages:

(i) The longitudinal tensile strength of the reinforcing member is governed by the highly oriented core portion and is no less than twice the value for the less oriented resin.

(ii) The thermal expansion characteristics of the reinforcing member are also governed by the highly oriented core portion and show a linear expansion coefficient that is no more than half the value for the less oriented resin.

(iii) The surface of the highly oriented core portion is protected by the less oriented resin, providing a significant improvement in the longitudinal tear strength of the highly oriented resin layer which inherently has a low tear strength in the longitudinal direction; and (iv) The highly oriented core which is sustained by the less oriented resin area in the peripheral direction has satisfactory tear resistance, so even if lateral compression is applied, the rigidity of the highly oriented resin layer is maximally utilized to exhibit good rupture properties. In addition, the bending capabilities under external stresses which are inherently low in the highly oriented resin are markedly improved to provide satisfactory protection against buckling.

Because of the features described above, optical fibers can be easily incorporated into cables by using the reinforcing member of the present invention, and the cables fabricated will perform reliably over an extended period. As already noted, it should be understood that the concept of the present invention is applicable to other fields such as cables wires and ropes.

What is claimed is:

1. A process for producing a reinforcing member in a form a of a solid wire or rod that contains a highly oriented resin as principal component and in which a degree of orientation decreases from center to periphery of said solid wire or rod, said process using a die having a molding port comprising at least one concentric molten resin extruding nozzle having a side wall with an inner and outer surface and a projecting rod member disposed along a central axis of said nozzle, and said process comprising extruding a molten highly oriented resin through said nozzle as a lubricant is applied to the inner surface of the side wall of said nozzle opposite to the projecting rod member such that shear stress applied to the resin is continuously increased from periphery to center.

2. A process according to claim 1 which uses a die having a molding port comprising two concentric molten resin extruding nozzles arranged to form a center and outer nozzle, and a highly oriented resin and a less oriented resin being extruded simultaneously through the center nozzle and the outer nozzle, respectively.

3. A process for producing a reinforcing member in a form of a hollow pipe having a solid wall with an inner and outer surface that contains a highly oriented resin as principal component and in which a degree of orientation of said resin decreases from the inner surface of the solid wall of said pipe to the outer surface, said process using a die having a molding port comprising both a central feed inlet for a fluid or an article to be reinforced and at least one molten resin extruding nozzle having a side wall with an inner and outer surface disposed concentrically with said feed inlet, and said process comprising extruding a molten highly oriented resin through said nozzle as a lubricant is applied only to the outer surface of the side wall of said nozzle such that shear stress applied to the resin is increased from the outer surface of the nozzle to its inner surface.

4. A process according to claim 3 which uses a die having a molding port comprising two concentric molten resin extruding nozzles arranged to form a center and outer nozzle, a highly oriented resin and the less oriented resin being extruded simultaneously through the center nozzle and the outer nozzle, respectively.

5. A process for producing a reinforcing member in a form of a hollow pipe having a solid wall with an inner and outer surface that contains a highly oriented resin as principal component and which has a highest degree of orientation in a center between the inner and outer surface of the solid wall of said pipe, said process using a die having a molding port comprising a central feed inlet for a fluid or an article to be reinforced, at least one molten resin extruding nozzle having a side wall with an inner and outer surface disposed concentrically, with said feed inlet, and a shear stress providing member in the form of a hollow pipe disposed concentrically with a highly oriented resin extruding nozzle which is disposed concentrically within one of said at least one molten resin extruding nozzle, and said process comprising extruding a molten highly oriented resin through said highly oriented resin extruding nozzle as a lubricant is applied only to both the inner and outer surfaces of said resin extruding nozzle such that shear stress becomes highest in a center between the inner and outer surface of said solid wall of said pipe.

6. A process according to claim 5 which uses a die having a molding port comprising two of said molten resin extruding nozzles disposed concentrically and said highly oriented resin extruding nozzle disposed concentrically within said two molten resin extruding nozzles, and the highly oriented resin being extruded from said highly oriented extruding nozzle as a less oriented resin is extruded simultaneously through at least one of the two molten resin extruding nozzles.

* * * * *